(12) United States Patent
Oshio et al.

(10) Patent No.: US 12,427,911 B2
(45) Date of Patent: Sep. 30, 2025

(54) LIGHT DISTRIBUTION CONTROL DEVICE, VEHICLE LIGHT SYSTEM, AND LIGHT DISTRIBUTION CONTROL METHOD

(71) Applicant: KOITO MANUFACTURING CO., LTD., Tokyo (JP)

(72) Inventors: Hirohiko Oshio, Shizuoka (JP); Yuichi Watano, Shizuoka (JP); Takashi Terayama, Shizuoka (JP); Hikaru Nagai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 115 days.

(21) Appl. No.: 18/539,669

(22) Filed: Dec. 14, 2023

(65) Prior Publication Data
US 2024/0109474 A1   Apr. 4, 2024

Related U.S. Application Data

(63) Continuation of application No. PCT/JP2022/024217, filed on Jun. 16, 2022.

(30) Foreign Application Priority Data

Jun. 21, 2021  (JP) ................................. 2021-102568

(51) Int. Cl.
  *B60Q 1/14*  (2006.01)
  *H05B 47/115*  (2020.01)
(52) U.S. Cl.
  CPC ............. *B60Q 1/14* (2013.01); *H05B 47/115* (2020.01); *B60Q 2300/054* (2013.01)

(58) Field of Classification Search
  CPC .... B60Q 1/14; B60Q 2300/054; B60Q 1/085; B60Q 2300/056; B60Q 2300/41;
  (Continued)

(56) References Cited

U.S. PATENT DOCUMENTS

2008/0225271 A1   9/2008  Ohmura
2017/0262715 A1   9/2017  Kozuka et al.
(Continued)

FOREIGN PATENT DOCUMENTS

JP       2006159928 A   6/2006
JP       2008226140 A   9/2008
(Continued)

OTHER PUBLICATIONS

Translation of WO-2019198789-A1 (Year: 2019).*
(Continued)

*Primary Examiner* — Renan Luque
(74) *Attorney, Agent, or Firm* — BUCHANAN, INGERSOLL & ROONEY PC (57) ABSTRACT

A light distribution control device, if a first upper limit number N1≥the number of near-distance targets T1, controls a lamp to irradiate the near-distance targets with light having illuminance according to attributes of the near-distance targets; if a remaining number M≥the number of long-distance targets T2, controls the lamp to irradiate the long-distance targets with light having illuminance according to attributes of the long-distance targets; if N1<T1, controls the lamp to form a light distribution pattern that does not depend on the near-distance targets and the long-distance targets; and, if M<T2, controls the lamp to form a light distribution pattern that does not depend on the long-distance targets.

10 Claims, 5 Drawing Sheets

(58) Field of Classification Search
CPC ............ B60Q 2300/42; B60Q 2300/45; B60Q 1/143; B60Q 1/04; B60Q 1/24; H05B 47/115; H05B 47/155; H05B 47/125
See application file for complete search history.

(56) References Cited

U.S. PATENT DOCUMENTS

2018/0170373 A1* 6/2018 Kwon ................. B60W 30/143
2022/0203888 A1* 6/2022 Tanimura ............... B60Q 1/535

FOREIGN PATENT DOCUMENTS

| JP | 2016088224 A | 5/2016 |
| JP | 2017001453 A | 1/2017 |
| JP | 2017159881 A | 9/2017 |
| WO | WO-2019198789 A1 * | 10/2019 |

OTHER PUBLICATIONS

International Preliminary Report on Patentability (PCT/ISA/373) with translation mailed Dec. 14, 2023, by the International Bureau of WIPO for International Application No. PCT/JP2022/024217. (9 pages).
International Search Report (PCT/ISA/210) with translation mailed Aug. 30, 2022, by the Japan Patent Office for International Application No. PCT/JP2022/024217. (6 pages).

\* cited by examiner

LIGHT DISTRIBUTION CONTROL DEVICE, VEHICLE LIGHT SYSTEM, AND LIGHT DISTRIBUTION CONTROL METHOD

CROSS-REFERENCE TO RELATED APPLICATIONS

This application is the continuation of International Patent Application No. PCT/JP2022/024217, filed on Jun. 16, 2022, which claims the benefit of priority from Japanese Patent Application No. 2021-102568, filed on Jun. 21, 2021, the entire content of each of which is incorporated herein by reference.

BACKGROUND

Field of the Invention

The present invention relates to a light distribution control device, a vehicle light system, and a light distribution control method.

Description of the Related Art

Recently, ADB (adaptive driving beam) control for controlling a light distribution pattern dynamically and adaptively based on the condition around a vehicle is proposed. ADB control is configured to detect, with a camera, the presence or absence of a vehicle in front for which high-brightness light irradiation should be avoided and to shield light in an area corresponding to the vehicle in front (see, for example, PATENT LITERATURE 1). Shielding light in an area corresponding to the vehicle in front can reduce glare experienced by the driver of the vehicle in front and, at the same time, improve viewability for the driver of the driver's vehicle.

PATENT LITERATURE 1: JP 2016-088224

In conventional ADB control, a vehicle in front has been mainly considered as a target of light distribution control. In order to improve viewability for the driver further, however, it is desirable to set objects other than the vehicle in front as a targets of light distribution control. For example, light reflected by a light-reflecting object such as a road sign, a delineator, and a signboard can expose the driver of the driver's vehicle to glare. For this reason, it is desirable to set the light-reflecting object as a target of light distribution control and reduce light in the area corresponding to the light-reflecting object. In addition, it is desirable for the driver of the driver's vehicle to be able to see pedestrians, obstacles (falling objects, etc.) on the road being traveled, road markings, etc. at an earlier stage. For this reason, it is desirable to set these as targets of light distribution control and increase light in the area corresponding to the pedestrian, etc.

As the number of targets of light distribution control increases, on the other hand, the light distribution pattern will change frequently. Frequency changes in the light distribution pattern may cause the driver of the driver's vehicle to feel visual annoyance. Visual annoyance can lead to a decrease in viewability for the driver.

SUMMARY OF THE INVENTION

The present invention addresses the issue described above, and a purpose thereof is to provide a technology for reducing visual annoyance experienced by the driver by light distribution control.

An embodiment of the present invention relates to a light distribution control device that controls light distribution of a variable light distribution lamp in accordance with objects located in an area in front of a vehicle. The objects include short-range objects located within a predetermined distance from the vehicle and long-range objects located outside the predetermined distance. The light distribution control device controls the variable light distribution lamp to irradiate the short-range object with a light of illuminance corresponding to the attributes of the short-range object when the first upper limit number N1 of objects potentially subject to light distribution control is equal to or greater than the number T1 of short-range objects, controls the variable light distribution lamp to irradiate the long-range object with a light of illuminance corresponding to the attributes of the long-range object when the remaining number M derived from subtracting the number T1 of short-range objects from the first upper limit number N1 is equal to or greater than the number T2 of long-range objects, controls the variable light distribution lamp to form a light distribution pattern that does not depend on the short-range object and the long-range object when the first upper limit number N1 is less than the number T1 of short-range objects, and controls the variable light distribution lamp to form a light distribution pattern that does not depend on the long-range object when the remaining number M is less than the number T2 of long-range objects.

Another embodiment of the present invention relates to a vehicle light system. The vehicle light system includes: a variable light distribution lamp capable of radiating a variable intensity distribution visible light beam to an area in front; and the light distribution control device according to the above embodiment.

Another embodiment of the present invention relates to a light distribution control method that controls light distribution of a variable light distribution lamp in accordance with objects located in an area in front of a vehicle. The objects include short-range objects located within a predetermined distance from the vehicle and long-range objects located outside the predetermined distance, the method including: controlling the variable light distribution lamp to irradiate the short-range object with a light of illuminance corresponding to attributes of the short-range object when a first upper limit number N1 of objects potentially subject to light distribution control is equal to or greater than a number T1 of short-range objects; controlling the variable light distribution lamp to irradiate the long-range object with a light of illuminance corresponding to attributes of the long-range object when a remaining number M derived from subtracting the number T1 of short-range objects from the first upper limit number N1 is equal to or greater than a number T2 of long-range objects; controlling the variable light distribution lamp to form a light distribution pattern that does not depend on the short-range object and the long-range object when the first upper limit number N1 is less than the number T1 of short-range objects; and controlling the variable light distribution lamp to form a light distribution pattern that does not depend on the long-range object when the remaining number M is less than the number T2 of long-range objects.

Optional combinations of the aforementioned constituting elements, and implementations of the present invention in the form of methods, apparatuses, and systems may also be practiced as additional modes of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 2 shows how an area in front of the driver's vehicle looks like;

DETAILED DESCRIPTION OF THE INVENTION

Hereinafter, the invention will be described based on preferred embodiments with reference to drawings. The embodiments do not limit the scope of the invention but exemplify the invention. Not all of the features and the combinations thereof described in the embodiments are necessarily essential to the invention. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless otherwise specified and are used to distinguish a certain feature from the others. Those of the members that are not material to the description of the embodiments are omitted in the drawings.

Figure 1:
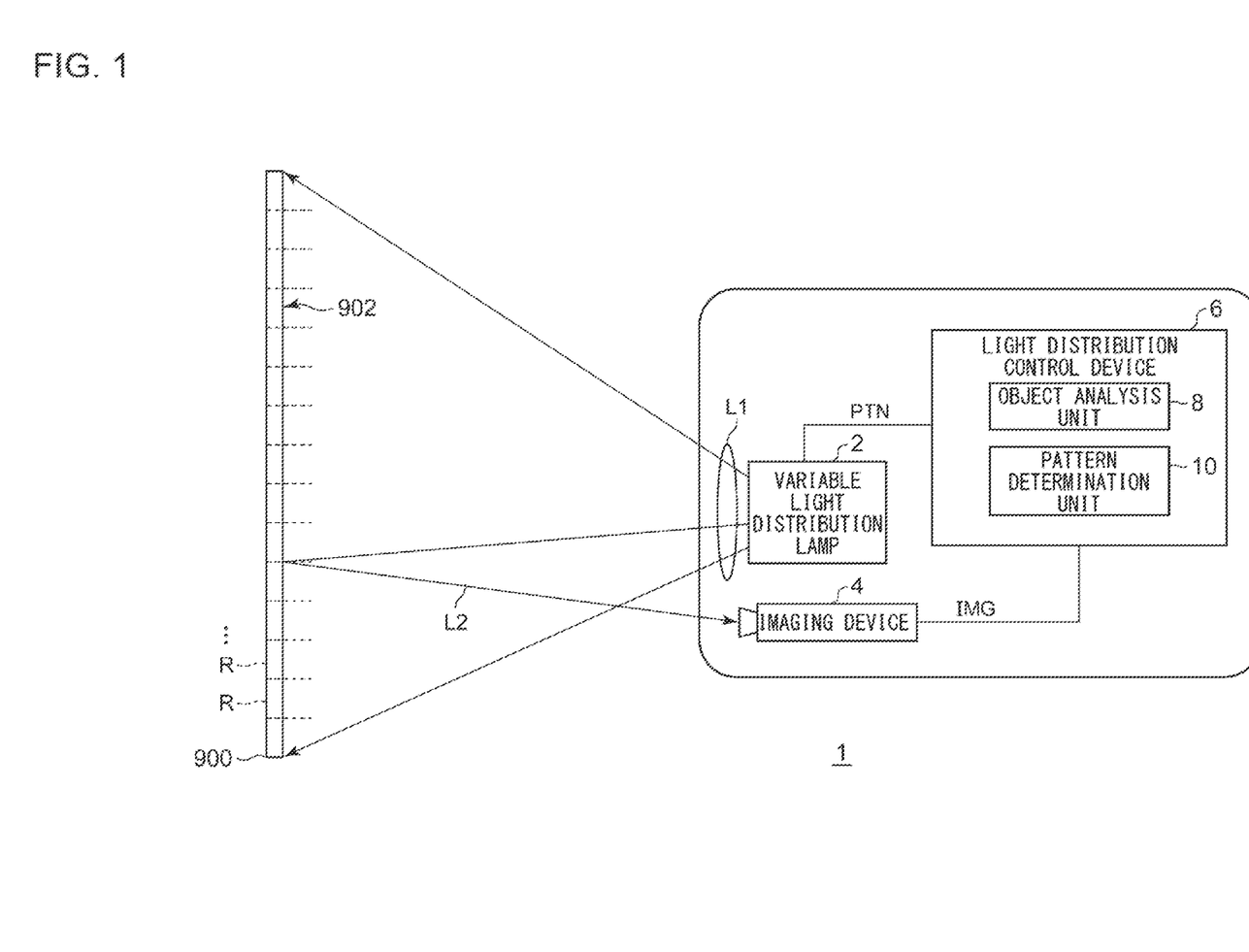
FIG. 1 is a block diagram of a vehicle light system according to the embodiment.

FIG. 1 is a block diagram of a vehicle light system 1 according to the embodiment. FIG. 1 depicts some of the constituting elements of the vehicle light system 1 as functional blocks. The functional blocks are implemented in hardware such as devices and circuits exemplified by a CPU and a memory of a computer, and in software such as a computer program. It will be understood by those skilled in the art that these functional blocks are implemented in a variety of manners by a combination of hardware and software.

The vehicle light system 1 includes a variable light distribution lamp 2, an imaging device 4, and a light distribution control device 6. These may be built in the same housing, or some of the members may be provided outside the housing. For example, the variable light distribution lamp 2, the imaging device 4, and the light distribution control device 6 are housed in a lamp chamber. The lamp chamber is bounded by a lamp body having an opening on the frontward side of the vehicle and a translucent cover attached to cover the opening of the lamp body. The imaging device 4 and the light distribution control device 6 may be provided outside the lamp chamber, and, for example, provided on the side of the vehicle. In this case, the imaging device 4 may be a vehicle-mounted camera. Further, the light distribution control device 6 may be formed by a vehicle ECU in the entirety or in part.

The variable light distribution lamp 2 is capable of radiating a variable intensity distribution visible light beam L1 to an area in front of the driver's vehicle. The variable light distribution lamp 2 can individually vary the illuminance of light irradiating a plurality of individual areas R arranged in the area in front. The plurality of individual areas R are arranged in, for example, a matrix. The variable light distribution lamp 2 receives information designating a light distribution pattern PTN from the light distribution control device 6 and outputs the visible light beam L1 having an intensity distribution determined by the light distribution pattern PTN. In this way, the light distribution pattern PTN is formed in front of the driver's vehicle. The light distribution pattern PTN is understood to be a two-dimensional illuminance distribution of an irradiation pattern 902 that the variable light distribution lamp 2 forms on a vertical virtual screen 900 in front of the driver's vehicle.

The embodiment is non-limiting as to the configuration of the variable light distribution lamp 2. For example, the variable light distribution lamp 2 includes a plurality of light sources arranged in a matrix and a lighting circuit that drives the light sources individually to light the light sources. Preferable examples of the light source include a semiconductor light source such as a LED (light emitting device), a LD (laser diode), and an organic or inorganic EL (electroluminescence). Each individual area R and each light source are associated with each other, and each individual area R is individually irradiated with light from each light source. The resolution of the variable light distribution lamp 2, i.e., the light distribution resolution, is about 1000 pixels-2000000 pixels. The resolution of the variable light distribution lamp 2 means the number of unit areas in the light distribution pattern PTN in which the illuminance can be varied independently.

For formation of an illuminance distribution determined by the light distribution pattern PTN, the variable light distribution lamp 2 may include a pattern formation device of matrix type such as a DMD (Digital Mirror Device) and a liquid crystal device or include a pattern formation device of optical scan type configured to scan an area in front of the driver's vehicle with a light from the light source.

The imaging device 4 has sensitivity in the visible light zone and images an area in front of the driver's vehicle repeatedly. The imaging device 4 images a reflected light L2 from an object in front of a vehicle reflecting the visible light beam L1 or images a light radiated from the vehicle in front. The imaging device 4 may have sensitivity at least in the wavelength band of the visible light beam L1. An image IMG generated by the imaging device 4 is transmitted to the light distribution control device 6.

The image IMG acquired by the light distribution control device 6 may be RAW image data or image data subjected to a predetermined image process by the imaging device 4 or other processing units. In the following description, "the image IMG based on the imaging device 4" means whichever of RAW image data and data subjected to an image process. Both of the image data may be expressed as "image IMG" without making any distinction therebetween.

The light distribution control device 6 performs ADB control for dynamically and adaptively control the light distribution of the variable light distribution lamp 2 in accordance with an object located in the area in front. The light distribution control device 6 may be comprised of a digital processor. For example, the light distribution control device 6 may be comprised of a combination of a microcomputer, including a CPU, and a software program. The light distribution control device 6 may alternatively be comprised of a FPGA (Field Programmable Gate Array), an ASIC (Application Specified IC), or the like. The light distribution control device 6 includes, by way of one example, an object analysis unit 8 and a pattern determination unit 10. Each part operates such that an integrated circuit constituting the part runs a program stored in a memory. A description will be given of light distribution pattern formation control by the light distribution control device 6.

Figure 2:
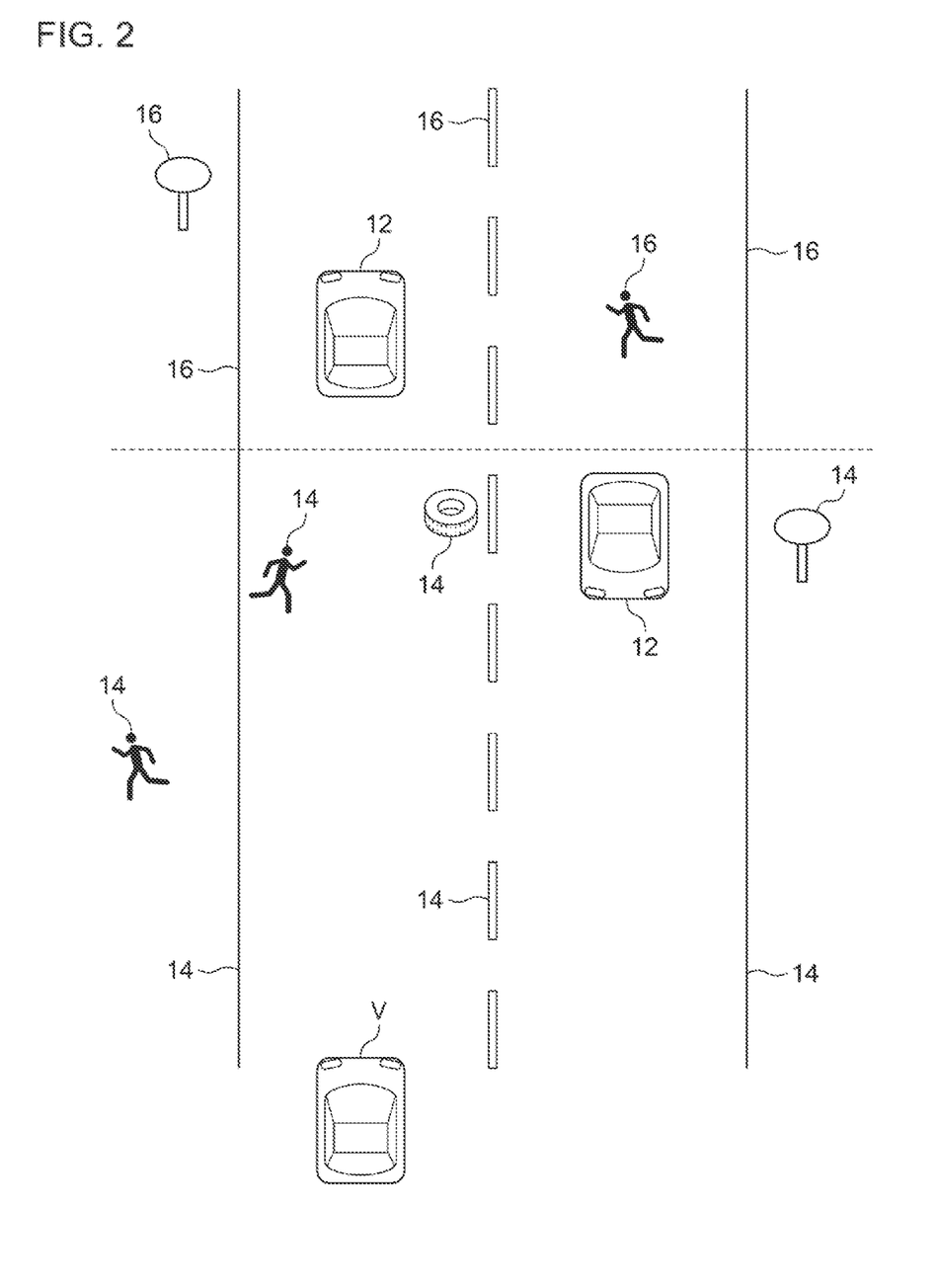

FIG. 2 shows how an area in front of the driver's vehicle V looks like. The object analysis unit 8 classifies objects located in the area in front. Specifically, objects located in the area in front are classified into vehicles in front 12, which include leading vehicles and oncoming vehicles, and other objects. Objects other than the vehicles in front 12 include pedestrians, road signs, delineators, signboards, road markings, obstacles, etc. Further, the object analysis unit 8 classifies objects other than the vehicles in front 12 into short-range objects 14 located within a predetermined distance from the driver's vehicle and long-range objects 16 located outside the predetermined distance. Then, the object analysis unit 8 calculates the number S of vehicles in front 12, the number T1 of short-range objects 14, and the number T2 of long-range object objects 16.

For example, the object analysis unit 8 maintains a predetermined distance threshold value in advance and defines an object at a distance less than the predetermined distance threshold value as a short-range object 14 and an object at a distance equal to or greater than the distance threshold value as a long-range object 16. The distance threshold value is determined based on, for example, the braking distance of the driver's vehicle V. Therefore, the distance threshold varies according to the vehicle speed of the driver's vehicle V. That is, the short-range object 14 is an object for which the driver's vehicle V cannot stop before the object, and the long-range object 16 is an object for which the driver's vehicle V can stop before the object. The distance threshold value can be set appropriately based on experiments and simulations.

Further, the object analysis unit 8 keeps track of the attributes of the short-range object 14 and the long-range object 16, respectively. The object analysis unit 8 of this embodiment keeps track of the brightness and position of each object as attributes of the object.

By way of one example, the object analysis unit 8 classifies objects and keeps track of attributes using the image IMG based on the imaging device 4. The object analysis unit 8 can determine the type of object, that is, whether the object is the vehicle in front 12 or an object other than the vehicle in front 12 by applying known image processing and image analysis on the image IMG. Further, the distance of each object can be detected from the position of contact of each object with the ground in the image IMG. This enables classification into short-range objects 14 and long-range objects 16. In addition, the attributes of each object, that is, position and brightness, can be known from the image IMG.

The object analysis unit 8 may isolate objects and keep track of attributes by using object information obtained from a ranging sensor, etc. Measurement of the ranging sensor is directed to the area in front to acquire information on the area in front. The ranging sensor can be configured by, for example, a millimeter wave radar, LiDAR (Light Detection and Ranging or Laser Imaging Detection and Ranging), etc.

The object analysis unit 8 sends the result of classification of the objects, including the number of objects of respective types, and information on the attributes of the respective objects to the pattern determination unit 10.

FIGS. 3, 4, 5A and 5B are flowcharts illustrating the flow of light distribution control (ADB control) executed by the light distribution control device 6. The connecter A in FIG. 3 connects to the connector A in FIG. 4. The connector B of FIG. 3 connects to the connector B of FIG. 4. This flow is repeatedly executed according to a predetermined timing schedule when, for example, an instruction for execution of light distribution control is given by a light switch (not shown) and when the ignition is on.

Figure 3:
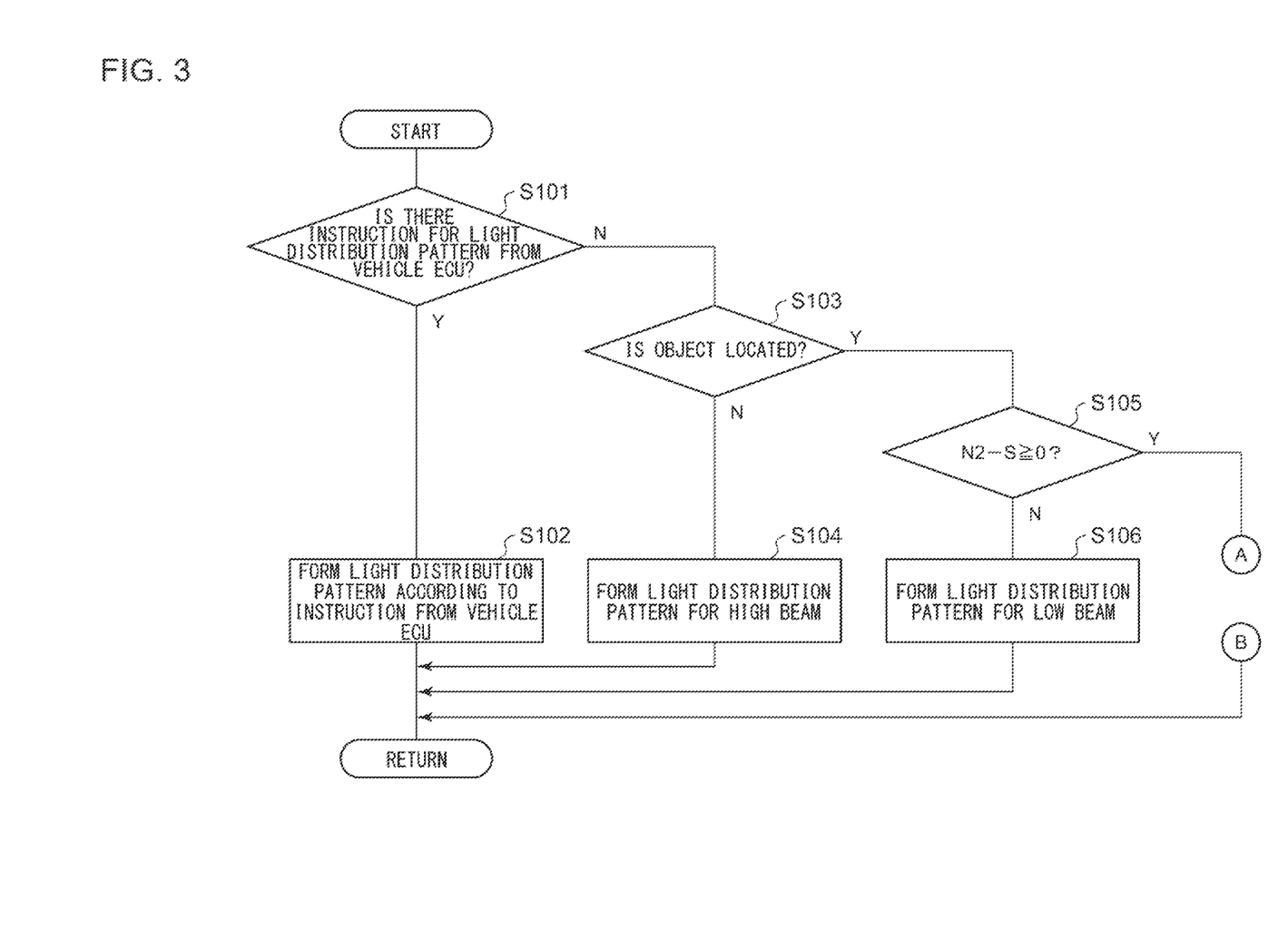
FIG. 3 is a flowchart illustrating the flow of light distribution control executed by the light distribution control device.

As shown in FIG. 3, the pattern determination unit 10 first determines whether an instruction for a light distribution pattern PTN to be formed has been received from the vehicle ECU (S101). When there is an instruction from the vehicle ECU for a light distribution pattern PTN (Y in S101), the pattern determination unit 10 controls the variable light distribution lamp 2 to form the light distribution pattern PTN according to the instruction of the vehicle ECU (S102) and ends the routine. When there is an instruction from the vehicle ECU for a light distribution pattern PTN, object analysis by the object analysis unit 8 may be omitted. Further, the process of step S101 may be omitted when the light distribution control device 6 is configured by the vehicle ECU.

When there is no instruction for a light distribution pattern PTN from the vehicle ECU (N in S101), the pattern determination unit 10 determines whether an object is located in the area in front of the vehicle V based on the information obtained from the object analysis unit 8 (S103). The pattern determination unit 10 determines the presence or absence of objects including the vehicle in front 12, the short-range object 14, and the long-range object 16. When there is no object in the area in front (N in S103), the pattern determination unit 10 determines a light distribution pattern PTN that prioritizes ensuring viewability for the driver of the driver's vehicle V to be the light distribution pattern PTN to be formed. In this embodiment, by way of one example, a known light distribution pattern Hi for high beam is determined to be the light distribution pattern PTN to be formed. Then, the variable light distribution lamp 2 is controlled to form the light distribution pattern Hi for high beam (S104), and the routine is ended.

When there is an object in the area in front (Y in S103), the pattern determination unit 10 determines whether a second upper limit number N2 is equal to or greater than the number S of vehicles in front 12 (S105). The second upper limit number N2 is maintained in advance in the pattern determination unit 10. By way of one example, the second upper limit number N2 is the maximum number of objects potentially subject to light distribution control by the light distribution control device 6. The second upper limit number N2 can, for example, be appropriately set based on experiments and simulations according to the relationship between the frequency of switching the light distribution pattern by ADB control and the visual annoyance felt by the driver of the driver's vehicle V or according to the performance of the light distribution control device 6, etc. The second upper limit number N2 is a value greater than a first upper limit number N1 described later.

When the second upper limit number N2 is less than the number S of vehicles in front 12 (N in S105), the pattern determination unit 10 determines a light distribution pattern PTN that does not depend on the presence of the vehicle in front 12, the presence and attributes of the short-range object 14, and the presence and attributes of the long-range object 16 to be the light distribution pattern PTN to be formed. In this embodiment, by way of one example, a known light distribution pattern Lo for low beam is determined to be the light distribution pattern PTN to be formed. Then, the variable light distribution lamp 2 is controlled to form the light distribution pattern Lo for low beam (S106), and this routine is ended.

Figure 4:
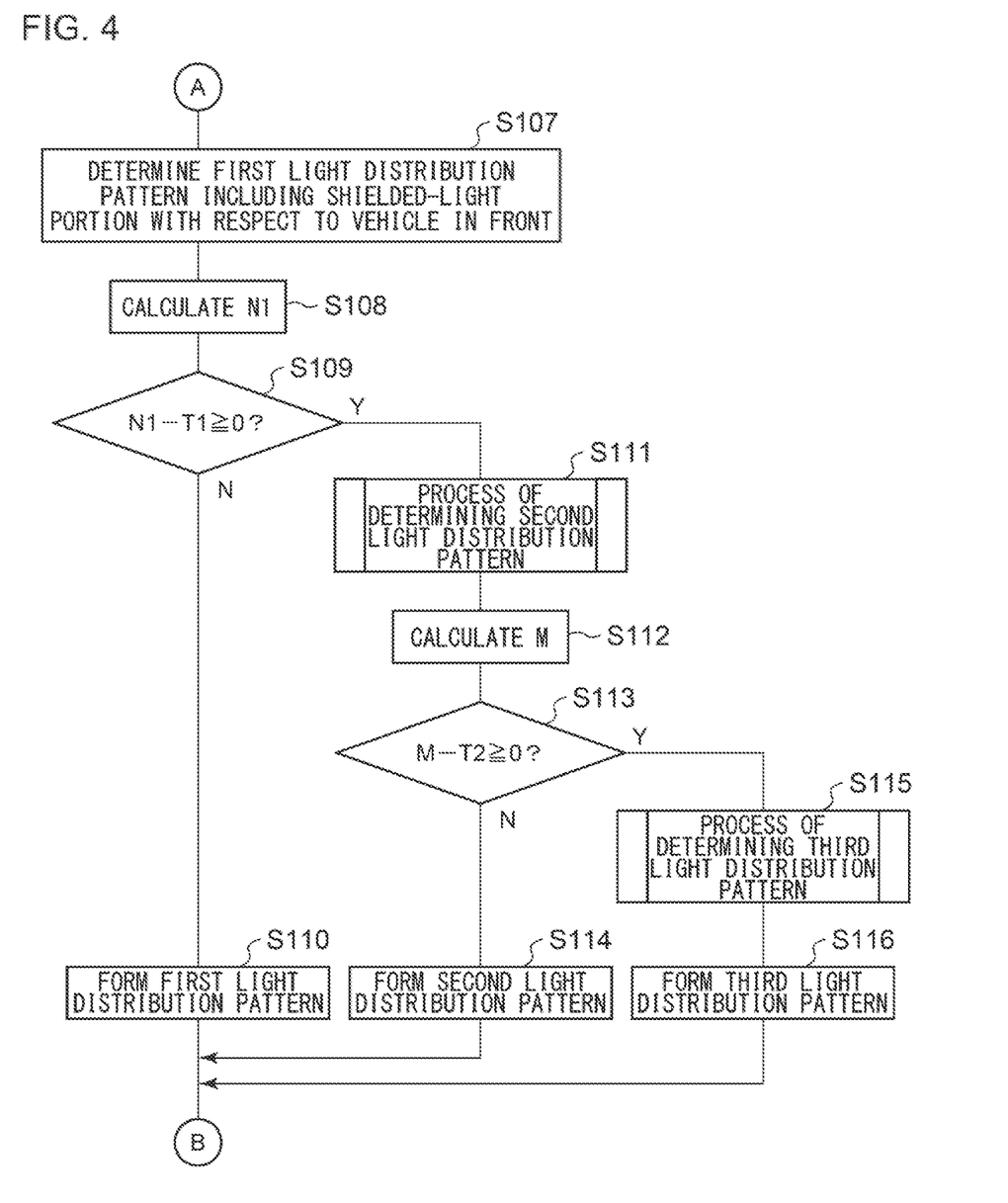
FIG. 4 is a flowchart illustrating the flow of light distribution control executed by the light distribution control device.

When the second upper limit number N2 is equal to or greater than the number S of vehicles in front 12 (Y in S105), the pattern determination unit 10 controls the variable light distribution lamp 2 to form a shielded-light portion with respect to the vehicle in front 12. In this embodiment, as shown in FIG. 4, a first light distribution pattern PTN1 including a shielded-light portion with respect to the vehicle in front 12 is determined to be the light distribution pattern PTN to be formed (S107). Thereby, ADB control is performed at least for the vehicle in front 12. By way of one example, the illuminance of the shielded-light portion is substantially zero. The illuminance of the shielded-light portion may be higher than zero and can be appropriately set based on experiments and simulations. Then, the pattern determination unit 10 calculates the first upper limit number N1 (N1=N2−S) by subtracting the number S of vehicles in front 12 from the second upper limit number N2 (S108). The first upper limit number N1 means the number of objects other than the vehicle in front 12 that are potentially subject to light distribution control by the light distribution control device 6.

Subsequently, the pattern determination unit 10 determines whether the first upper limit number N1 is equal to or greater than the number T1 of short-range objects 14 (S109). When the first upper limit number N1 is less than the number T1 of short-range objects 14 (N in S109), the pattern determination unit 10 determines a light distribution pattern PTN that does not depend on the presence and attributes of the short-range object 14 and the presence and attributes of the long-range object 16 as the light distribution pattern PTN to be formed. In this embodiment, the first light distribution pattern PTN1 is determined to be the light distribution pattern PTN to be formed. Then, the variable light distribution lamp 2 is controlled to form the first light distribution pattern PTN1 (S110), and the routine is ended.

When the first upper limit number N1 is equal to or greater than the number T1 of short-range objects 14 (Y in S109), the pattern determination unit 10 controls the variable light distribution lamp 2 to irradiate the short-range object 14 with a light of illuminance corresponding to the attributes of the short-range object 14. The pattern determination unit 10 of this embodiment executes a process of determining the second light distribution pattern PTN2 in order to determine the illuminance corresponding to the attributes of the short-range object 14 (S111). Thereby, ADB control is performed at least for the vehicle in front 12 and the short-range object 14.

Figure 5A:
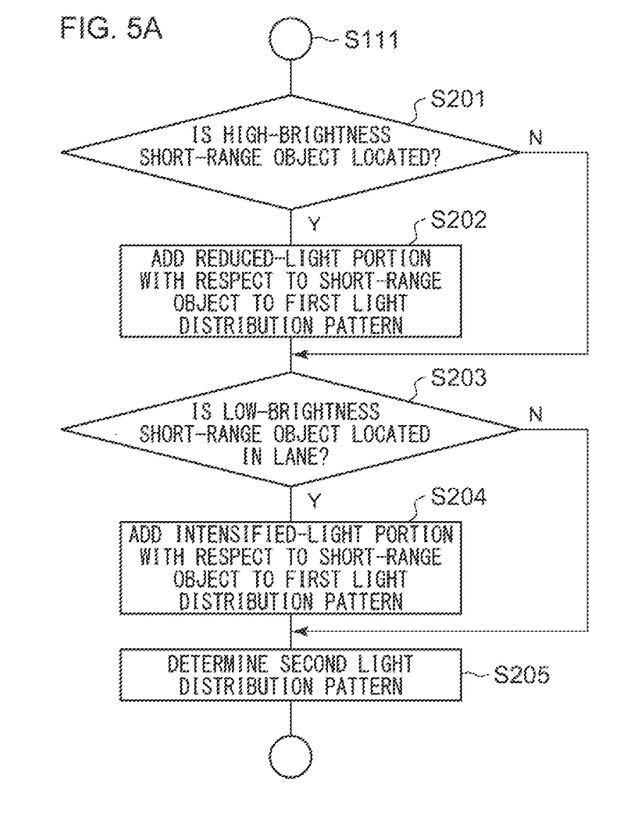
FIGS. 5A and 5B are flowcharts illustrating the flow of light distribution control executed by the light distribution control device.

As shown in FIG. 5A, the pattern determination unit 10 first determines whether there is a high-brightness short-range object 14 (S201) in the process of determining the second light distribution pattern PTN2. For example, the pattern determination unit 10 maintains a predetermined brightness threshold value in advance. Then, based on the information obtained from the object analysis unit 8, the pattern determination unit 10 determines the short-range object 14 with a brightness equal to or higher than the predetermined brightness threshold value to be a high-brightness short-range object 14. The brightness threshold value can be appropriately set based on experiments and simulations. For example, the brightness threshold value is set to a value that can distinguish a light-reflecting object such as a road sign, a delineator, and a signboard from other objects. By way of one example, a light-reflecting object is an object having a retroreflective surface at least in a portion visible from the driver's vehicle.

When there is a high-brightness short-range object 14 (Y in S201), the pattern determination unit 10 controls the variable light distribution lamp 2 to lower the illuminance of light irradiating the high-brightness short-range object 14. That is, the pattern determination unit 10 adds a reduced-light portion to the first light distribution pattern PTN1 with respect to the high-brightness short-range object 14 (S202). The illuminance of the reduced-light portion is, for example, higher than that of the shielded-light portion and lower than the illuminance before light modulation and is an illuminance that can suppress glare that the light-reflecting object exposes the driver of the driver's vehicle V to. The illuminance of the reduced-light portion can be appropriately set based on experiments and simulations. When there is no high-brightness short-range object 14 (N in S201), the pattern determination unit 10 skips step S202.

Subsequently, the pattern determination unit 10 determines whether there is a low-brightness short-range object 14 on the road being traveled by the driver's vehicle V, i.e., in the lane (S203). The low-brightness short-range object 14 is a short-range object 14 having a brightness less than the brightness threshold value. When there is a low-brightness short-range object 14 in the lane (Y in S203), the pattern determination unit 10 controls the variable light distribution lamp 2 to increase the illuminance of light irradiating the low-brightness short-range object 14 in the lane. That is, the pattern determination unit 10 adds an intensified-light portion to the first light distribution pattern PTN1 with respect to the low-brightness short-range object 14 in the lane (S204). The illuminance of the intensified-light portion is higher than the illuminance before modulation and is an illuminance that can guide the line of sight of the driver of the driver's vehicle V to the short-range object 14 in the lane. The illuminance of the intensified-light portion can be appropriately set based on experiments and simulations. When there is no low-brightness short-range object 14 in the lane (N in S203), the pattern determination unit 10 skips step S204.

Through the above process, when there is a high-brightness short-range object 14, the pattern determination unit 10 determines the second light distribution pattern PTN2 in which a reduced-light portion with respect to the short-range object 14 is added to the first light distribution pattern PTN1, and when there is a low-brightness short-range object 14 in the lane, the pattern determination unit 10 determines the second light distribution pattern PTN2 in which an intensified-light portion with respect to the short-range object 14 is added to the first light distribution pattern PTN1 (S205). Light irradiation with the illuminance before light modulation is maintained with respect to the low-brightness short-range object 14 outside the lane. Subsequently, as shown in FIG. 4, the pattern determination unit 10 calculates a remaining number M (M=N1−T1) by subtracting the number T1 of short-range objects 14 from the first upper limit number N1 (S112). The remaining number M means the number of objects other than the vehicle in front 12 and the short-range object 14 that are potentially subject to light distribution control by the light distribution control device 6.

Subsequently, the pattern determination unit 10 determines whether the remaining number M is equal to or greater than the number T2 of long-range objects 16 (S113). When the remaining number M is less than the number T2 of long-range objects 16 (N in S113), the pattern determination unit 10 determines a light distribution pattern PTN that does not depend on the presence and attributes of the long-range object 16 as the light distribution pattern PTN to be formed. In this embodiment, the second light distribution pattern PTN2 is determined to be the light distribution pattern PTN to be formed. Then, the variable light distribution lamp 2 is controlled to form the second light distribution pattern PTN2 (S114), and the routine is ended.

When the remaining number M is equal to or greater than the number T2 of long-range objects 16 (Y in S113), the pattern determination unit 10 controls the variable light distribution lamp 2 to irradiate the long-range object 16 with a light of illuminance corresponding to the attributes of the long-range object 16. The pattern determination unit 10 of this embodiment executes a process of determining the third light distribution pattern PTN3 in order to determine the illuminance corresponding to the attributes of the long-range object 16 (S115). Thereby, ADB control is performed for the vehicle in front 12, the short-range object 14, and the long-range object 16.

Figure 5B:
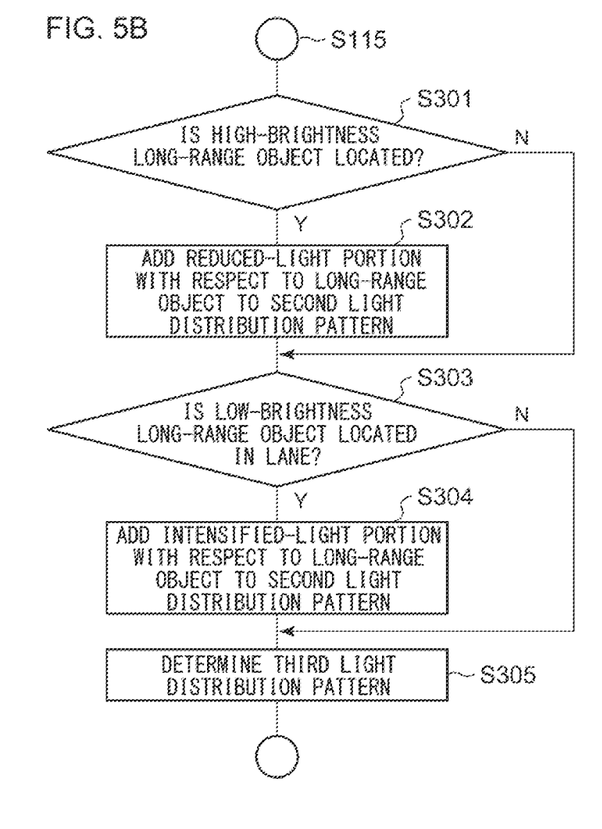

As shown in FIG. 5B, the pattern determination unit 10 first determines whether there is a high-brightness long-range object 16 (S301) in the process of determining the third light distribution pattern PTN3. The method for determining the presence or absence of a high-brightness long-range object 16 is the same as the method for determining the presence or absence of a high-brightness short-range object 14. When there is a high-brightness long-range object 16 with a brightness equal to or higher than the predetermined brightness threshold value (Y in S301), the pattern determination unit 10 controls the variable light distribution lamp 2 to lower the illuminance of light irradiating the high-brightness long-range object 16. That is, the pattern determination unit 10 adds a reduced-light portion to the second light distribution pattern PTN2 (S302) with respect to the high-brightness long-range object 16. The method for setting the illuminance of the reduced-light portion is the same as the method for setting the illuminance of the reduced-light portion in the process of determining the second light distribution pattern PTN2. When there is no high-brightness long-range object 16 (N in S301), the pattern determination unit 10 skips step S302.

Subsequently, the pattern determination unit 10 determines whether there is a low-brightness long-range object 16 on the road being traveled by the driver's vehicle V, that is, in the lane (S303). The low-brightness long-range object 16 is a long-range object 16 having a brightness less than the brightness threshold value. When there is a low-brightness long-range object 16 in the lane (Y in S303), the pattern determination unit 10 controls the variable light distribution lamp 2 to increase the illuminance of light irradiating the low-brightness long-range object 16 in the lane. That is, the pattern determination unit 10 adds an intensified-light portion to the second light distribution pattern PTN2 with respect to the low-brightness long-range object 16 in the lane (S304). The method for setting the illuminance of the intensified-light portion is the same as the method for setting the illuminance of the intensified-light portion in the process of determining the second light distribution pattern PTN2. When there is no low-brightness long-range object 16 in the lane (N in S303), the pattern determination unit 10 skips step S304.

Through the above process, when there is a high-brightness long-range object 16, the pattern determination unit 10 determines the third light distribution pattern PTN3 in which a reduced-light portion with respect to the long-range object 16 is added to the second light distribution pattern PTN2, and when there is a low-brightness long-range object 16 in the lane, the pattern determination unit 10 determines the third light distribution pattern PTN3 in which an intensified-light portion with respect to the long-range object 16 is added to the second light distribution pattern PTN2 (S305). Light irradiation with the illuminance before light modulation is maintained with respect to the low-brightness long-range object 16 outside the lane. Subsequently, as shown in FIG. 4, the pattern determination unit 10 controls the variable light distribution lamp 2 to form the determined third light distribution pattern PTN3 (S116) and ends the routine.

The variable light distribution lamp 2 is driven to form the light distribution pattern PTN determined by the pattern determination unit 10. When the light modulation method of the light source is analog light modulation, for example, the variable light distribution lamp 2 adjusts the DC level of the drive current flowing through the light source. Further, when the light modulation method of the light source is PWM (Pulse Width Modulation) light modulation, the variable light distribution lamp 2 switches the current flowing through the light source and adjusts the ratio of the on-period to adjust the average level of the drive current. Further, when the variable light distribution lamp 2 includes a DMD, on/off switching of each mirror element constituting the DMD may be controlled. When the variable light distribution lamp 2 includes a liquid crystal device, the light transmittance of the liquid crystal device may be controlled. Thereby, a light distribution pattern PTN is formed in front of the vehicle.

As described above, the light distribution control device 6 according to this embodiment controls the variable light distribution lamp 2 to irradiate the short-range object 14 with a light of illuminance corresponding to the attributes of the short-range object 14, when the first upper limit number N1 of objects potentially subject to light distribution control is equal to or greater than the number T1 of short-range objects 14. Further, when the remaining number M derived from subtracting the number T1 of short-range objects 14 from the first upper limit number N1 is equal to or greater than the number T2 of long-range objects 16, the variable light distribution lamp 2 is controlled to irradiate the long-range object 16 with a light of illuminance corresponding to the attributes of the long-range object 16.

That is, in this embodiment, an upper limit (first upper limit number N1) is set to the number of short-range objects 14 and long-range object 16 subject to ADB control. When the number T1 of short-range objects 14 is equal to or less than the first upper limit number N1, ADB control is first applied to the short-range object 14. Subsequently, when the number T2 of long-range objects 16 is equal to or less than the number of objects (remaining number M) that remains after the number is assigned to the short-range objects 14, ADB control is applied to the long-range object 16. Therefore, the short-range object 14 is subject to ADB control in preference to the long-range object 16. The short-range object 14 is more likely affect the driving of the driver's vehicle V than the long-range object 16. For this reason, viewability for the driver of the driver's vehicle V with respect to the short-range object 14 can be increased and the safety of vehicle driving can be improved by preferentially applying ADB control to the short-range object 14.

Further, when the number T1 of short-range objects 14 exceeds the first upper limit number N1, the light distribution control device 6 determines the illuminance of light irradiating the short-range object 14 and the long-range object 16 regardless of these objects. That is, ADB control for the short-range object 14 and the long-range object 16 is abandoned. Further, when the number T2 of long-range objects 16 exceeds the remaining number M, the illuminance of light irradiating the long-range object 16 is determined regardless of the long-range object 16. That is, the ADB control over the long-range object 16 is abandoned. Thereby, even if the number of objects subject to ADB control increases, it is possible to inhibit frequent switching of the light distribution pattern. Therefore, the risk of the driver of the driver's vehicle V feeling visual annoyance can be reduced, and a decrease in the driver's viewability can be mitigated.

In further accordance with this embodiment, the second upper limit number N2 of objects potentially subject to light distribution control is provided such that the second upper limit number N2 is larger than the first upper limit number N1. Then, when the second upper limit number N2 is equal to or greater than the number S of vehicles in front 12, the light distribution control device 6 controls the variable light distribution lamp 2 to form a shielded-light portion with respect to the vehicle in front 12. Then, the first upper limit number N1 is calculated by subtracting the number S of vehicles in front 12 from the second upper limit number N2. Therefore, the vehicle in front 12 is subject to ADB control in preference to the short-range object 14 and the long-range object 16. Thereby, glare experienced by the driver of the vehicle in front 12 can be reduced more reliably, and the safety of vehicle driving can be improved.

Further, when the number S of vehicles in front 12 exceeds the second upper limit number N2, the light distribution control device 6 determines the illuminance of light irradiating the vehicle in front 12, the short-range object 14, and the long-range object 16 regardless of these objects. In other words, ADB control is discarded for all objects. Thereby, the risk of the driver of the driver's vehicle V feeling visual annoyance can be further reduced, and a decrease in the driver's viewability can be mitigated.

Further, when irradiating the short-range object 14 with a light of illuminance corresponding to the attributes of the short-range object 14, the light distribution control device 6 of this embodiment controls the variable light distribution lamp 2 to lower the illuminance of light irradiating the high-brightness short-range object 14. Thereby, glare experienced by the driver of the driver's vehicle V due to the high-brightness short-range object 14 can be mitigated, and the safety of vehicle driving can be improved. Further, the variable light distribution lamp 2 is controlled to increase the illuminance of light irradiating the low-brightness short-range object 14 located on the road being traveled by the driver's vehicle V. Thereby, the driver of the driver's vehicle V can see the low-brightness short-range object 14 in the lane more easily, and the safety of vehicle driving can be improved.

The low-brightness short-range object 14 outside the lane is less likely to affect the driving of the driver's vehicle V than the high-brightness short-range object 14 or the low-brightness short-distance object 14 in the lane. Therefore, ADB control is not applied to the low-brightness short-range object 14 outside the lane. Thus, by selecting the short-range object 14 subject to ADB control, the risk of the driver of the driver's vehicle V feeling visual annoyance can be reduced, and a decrease in the driver's viewability can be mitigated.

Further, the light distribution control device 6 of this embodiment controls the variable light distribution lamp 2 to lower the illuminance of light irradiating the high-brightness long-range object 16 when irradiating the high-brightness long-range object 16 with a light of illuminance corresponding to the attributes of the long-range object 16. Thereby, glare experienced by the driver of the driver's vehicle V due to the high-brightness long-range object 16 can be mitigated, and the safety of vehicle driving can be improved. Further, the variable light distribution lamp 2 is controlled to increase the illuminance of light irradiating the low-brightness long-range object 16 located on the road being traveled by the driver's vehicle V. Thereby, the driver of the driver's vehicle V can see the low-brightness long-range object 16 in the lane more easily, and the safety of vehicle driving can be improved.

The low-brightness long-range object 16 outside the lane is less likely to affect the driving of the driver's vehicle V than the high-brightness long-range object 16 or the low-brightness long-range object 16 in the lane. Therefore, ADB control is not applied to the low-brightness long-range object 16 outside the lane. Thus, the risk of the driver of the driver's vehicle V feeling visual annoyance can be reduced, and a decrease in the driver's viewability can be mitigated by selecting the long-range object 16 subject to ADB control.

The embodiment of the present invention is described above in detail. The embodiment described above is merely a specific example of practicing the present invention. The details of the embodiment shall not be construed as limiting the technical scope of the present invention. A number of design modifications such as modification, addition, deletion, etc. of constituting elements may be made to the extent that they do not depart from the idea of the invention defined by the claims. New embodiments with design modifications will provide the combined advantages of the embodiment and the variation. Although the details subject to such design modification are emphasized in the embodiment described above by using phrases such as "of this embodiment" and "in this embodiment", details not referred to as such are also subject to design modification. Any combination of the above constituting elements is also useful as a mode of the present invention. Hatching in the cross section in the drawings should not be construed as limiting the material of the hatched object.

The invention according to the embodiment described above may be defined by the following items.

[Item 1]

A light distribution control device (6) that controls light distribution of a variable light distribution lamp (2) in accordance with objects located in an area in front of a vehicle (V), wherein the objects include short-range objects (14) located within a predetermined distance from the vehicle (V) and long-range objects (16) located outside the predetermined distance, wherein, when a first upper limit number N1 of objects potentially subject to light distribution control is equal to or greater than a number T1 of short-range objects (14), the light distribution control device (6) controls the variable light distribution lamp (2) to irradiate the short-range object (14) with a light of illuminance corresponding to attributes of the short-range object (14), wherein, when a remaining number M derived from subtracting the number T1 of short-range objects (14) from the first upper limit number N1 is equal to or greater than a number T2 of long-range objects (16), the light distribution control device (6) controls the variable light distribution lamp (2) to irradiate the long-range object (16) with a light of illuminance corresponding to attributes of the long-range object (16), and wherein, when the first upper limit number N1 is less than the number T1 of short-range objects (14), the light distribution control device controls the variable light distribution lamp (2) to form a light distribution pattern (PTN, PTN1) that does not depend on the short-range object (14) and the long-range object (16) and, when the remaining number M is less than the number T2 of long-range objects (16), the light distribution control device (6) controls the variable light distribution lamp (2) to form a light distribution pattern (PTN, PTN2) that does not depend on the long-range object (16).

[Item 2]

The light distribution control device (6) according to item 1,
wherein the objects include a vehicle in front (12),
wherein, when a second upper limit number N2 of objects potentially subject to light distribution control larger than the first upper limit number N1 is equal to or greater than a number S of vehicles in front (12), the light distribution control device (6) controls the variable light distribution lamp (2) to form a shielded-light portion with respect to the vehicle in front (12) and calculates the first upper limit number N1 by subtracting the number S of vehicles in front (12) from the second upper limit number N2, and
wherein, when the second upper limit number N2 is less than the number S of vehicles in front (12), the light distribution control device (6) controls the variable light distribution lamp (2) to form a light distribution pattern (PTN, Lo) that does not depend on the vehicle in front (12), the short-range object (14), and the long-range object (16).

[Item 3]

The light distribution control device (6) according to item 1 or 2,
wherein, when irradiating the short-range object (14) with a light of illuminance corresponding to the attributes of the short-range object (14),
the light distribution control device (6) controls the variable light distribution lamp (2) to lower an illuminance of light irradiating the short-range object (14) in a case a brightness of the short-range object (14) is equal to or higher than a predetermined value, and the light distribution control device (6) controls the variable light distribution lamp (2) to increase the illuminance of light irradiating the short-range object (14) in a case the brightness of the short-range object (14) is less than the predetermined value and the short-range object (14) is located on a road being traveled by the vehicle (V).

[Item 4]

The light distribution control device (6) according to any one of items 1 through 3,
wherein, when irradiating the long-range object (16) with a light of illuminance corresponding to the attributes of the long-range object (16),
the light distribution control device (6) controls the variable light distribution lamp (2) to lower an illuminance of light irradiating the long-range object (16) in a case a brightness of the long-range object (16) is equal to or higher than a predetermined value, and the light distribution control device (6) controls the variable light distribution lamp (2) to increase the illuminance of light irradiating the long-range object (16) in a case the brightness of the long-range object (16) is less than the predetermined value and the long-range object (16) is located on a road being traveled by the vehicle (V).

[Item 5]

A vehicle light system (1) including:
a variable light distribution lamp (2) capable of radiating a variable intensity distribution visible light beam (L1) to an area in front; and
the light distribution control device (6) according to any one of items 1 through 4.

[Item 6]

A light distribution control method that controls light distribution of a variable light distribution lamp (2) in accordance with objects located in an area in front of a vehicle (V),
wherein the objects include short-range objects (14) located within a predetermined distance from the vehicle (V) and long-range objects (16) located outside the predetermined distance,
the method including:
controlling the variable light distribution lamp (2) to irradiate the short-range object (14) with a light of illuminance corresponding to attributes of the short-range object (14) when a first upper limit number N1 of objects potentially subject to light distribution control is equal to or greater than a number T1 of short-range objects (14);
controlling the variable light distribution lamp (2) to irradiate the long-range object (16) with a light of illuminance corresponding to attributes of the long-range object (16) when a remaining number M derived from subtracting the number T1 of short-range objects (14) from the first upper limit number N1 is equal to or greater than a number T2 of long-range objects (16);
controlling the variable light distribution lamp (2) to form a light distribution pattern (PTN, PTN1) that does not depend on the short-range object (14) and the long-range object (16) when the first upper limit number N1 is less than the number T1 of short-range objects (14); and
controlling the variable light distribution lamp (2) to form a light distribution pattern (PTN, PTN2) that does not depend on the long-range object (16) when the remaining number M is less than the number T2 of long-range objects (16).

What is claimed is:

1. A light distribution control device that controls light distribution of a variable light distribution lamp in accordance with objects located in an area in front of a vehicle,
wherein the objects include short-range objects located within a predetermined distance from the vehicle and long-range objects located outside the predetermined distance,
wherein, when a first upper limit number N1 of objects potentially subject to light distribution control is equal to or greater than a number T1 of short-range objects, the light distribution control device controls the variable light distribution lamp to irradiate the short-range object with a light of illuminance corresponding to attributes of the short-range object,
wherein, when a remaining number M derived from subtracting the number T1 of short-range objects from the first upper limit number N1 is equal to or greater than a number T2 of long-range objects, the light distribution control device controls the variable light distribution lamp to irradiate the long-range object with a light of illuminance corresponding to attributes of the long-range object, and
wherein, when the first upper limit number N1 is less than the number T1 of short-range objects, the light distribution control device controls the variable light distribution lamp to form a light distribution pattern that does not depend on the short-range object and the long-range object and, when the remaining number M is less than the number T2 of long-range objects, the light distribution control device controls the variable light distribution lamp to form a light distribution pattern that does not depend on the long-range object.

2. The light distribution control device according to claim 1,
wherein the objects include a vehicle in front,
wherein, when a second upper limit number N2 of objects potentially subject to light distribution control larger than the first upper limit number N1 is equal to or greater than a number S of vehicles in front, the light distribution control device controls the variable light distribution lamp to form a shielded-light portion with respect to the vehicle in front and calculates the first upper limit number N1 by subtracting the number S of vehicles in front from the second upper limit number N2, and
wherein, when the second upper limit number N2 is less than the number S of vehicles in front, the light distribution control device controls the variable light distribution lamp to form a light distribution pattern that does not depend on the vehicle in front, the short-range object, and the long-range object.

3. The light distribution control device according to claim 1,
wherein, when irradiating the short-range object with a light of illuminance corresponding to the attributes of the short-range object,
the light distribution control device controls the variable light distribution lamp to lower an illuminance of light irradiating the short-range object in a case a brightness of the short-range object is equal to or higher than a predetermined value, and
the light distribution control device controls the variable light distribution lamp to increase the illuminance of light irradiating the short-range object in a case the brightness of the short-range object is less than the predetermined value and the short-range object is located on a road being traveled by the vehicle.

4. The light distribution control device according to claim 2,
wherein, when irradiating the short-range object with a light of illuminance corresponding to the attributes of the short-range object,
the light distribution control device controls the variable light distribution lamp to lower an illuminance of light irradiating the short-range object in a case a brightness of the short-range object is equal to or higher than a predetermined value, and
the light distribution control device controls the variable light distribution lamp to increase the illuminance of light irradiating the short-range object in a case the brightness of the short-range object is less than the predetermined value and the short-range object is located on a road being traveled by the vehicle.

5. The light distribution control device according to claim 1,
wherein, when irradiating the long-range object with a light of illuminance corresponding to the attributes of the long-range object,
the light distribution control device controls the variable light distribution lamp to lower an illuminance of light irradiating the long-range object in a case a brightness of the long-range object is equal to or higher than a predetermined value, and
the light distribution control device controls the variable light distribution lamp to increase the illuminance of light irradiating the long-range object in a case the brightness of the long-range object is less than the predetermined value and the long-range object is located on a road being traveled by the vehicle.

6. The light distribution control device according to claim 2,
wherein, when irradiating the long-range object with a light of illuminance corresponding to the attributes of the long-range object,
the light distribution control device controls the variable light distribution lamp to lower an illuminance of light irradiating the long-range object in a case a brightness of the long-range object is equal to or higher than a predetermined value, and
the light distribution control device controls the variable light distribution lamp to increase the illuminance of light irradiating the long-range object in a case the brightness of the long-range object is less than the predetermined value and the long-range object is located on a road being traveled by the vehicle.

7. The light distribution control device according to claim 3,
wherein, when irradiating the long-range object with a light of illuminance corresponding to the attributes of the long-range object,
the light distribution control device controls the variable light distribution lamp to lower an illuminance of light irradiating the long-range object in a case a brightness of the long-range object is equal to or higher than a predetermined value, and
the light distribution control device controls the variable light distribution lamp to increase the illuminance of light irradiating the long-range object in a case the brightness of the long-range object is less than the predetermined value and the long-range object is located on a road being traveled by the vehicle.

8. The light distribution control device according to claim 4,
wherein, when irradiating the long-range object with a light of illuminance corresponding to the attributes of the long-range object,
the light distribution control device controls the variable light distribution lamp to lower an illuminance of light irradiating the long-range object in a case a brightness of the long-range object is equal to or higher than a predetermined value, and
the light distribution control device controls the variable light distribution lamp to increase the illuminance of light irradiating the long-range object in a case the brightness of the long-range object is less than the predetermined value and the long-range object is located on a road being traveled by the vehicle.

9. A vehicle light system comprising:
a variable light distribution lamp capable of radiating a variable intensity distribution visible light beam to an area in front; and
the light distribution control device according to claim 1.

10. A light distribution control method that controls light distribution of a variable light distribution lamp in accordance with objects located in an area in front of a vehicle,
wherein the objects include short-range objects located within a predetermined distance from the vehicle and long-range objects located outside the predetermined distance,
the method comprising:
controlling the variable light distribution lamp to irradiate the short-range object with a light of illuminance corresponding to attributes of the short-range object when a first upper limit number N1 of objects potentially subject to light distribution control is equal to or greater than a number T1 of short-range objects;

controlling the variable light distribution lamp to irradiate the long-range object with a light of illuminance corresponding to attributes of the long-range object when a remaining number M derived from subtracting the number T1 of short-range objects from the first upper limit number N1 is equal to or greater than a number T2 of long-range objects;

controlling the variable light distribution lamp to form a light distribution pattern that does not depend on the short-range object and the long-range object when the first upper limit number N1 is less than the number T1 of short-range objects; and controlling the variable light distribution lamp to form a light distribution pattern that does not depend on the long-range object when the remaining number M is less than the number T2 of long-range objects.

* * * * *